United States Patent [19]

Enyeart

[11] 4,057,933
[45] Nov. 15, 1977

[54] APPARATUS FOR AERATING COMMINUTED MATTER SUCH AS SOIL

[76] Inventor: Lyle F. Enyeart, 802 16th Ave., Scottsbluff, Nebr. 69361

[21] Appl. No.: 683,258

[22] Filed: May 5, 1976

[51] Int. Cl.² .................. A01G 9/24; A01G 31/02
[52] U.S. Cl. ...................... 47/79; 47/1 A; 47/62
[58] Field of Search ............ 47/1, 38, 38.1, 48.5, 47/2, 58, 19, 79, 59, 62, 63, 64; 61/13

[56] References Cited

U.S. PATENT DOCUMENTS

| 42,176 | 4/1864 | Fisher | 47/58 |
|---|---|---|---|
| 965,895 | 8/1910 | Hardin | 61/13 |
| 1,173,534 | 2/1916 | Ryan | 47/1 |
| 1,200,869 | 10/1916 | Rise | 61/13 |
| 1,967,803 | 7/1934 | Boland | 61/13 |
| 1,991,851 | 2/1935 | Hammell | 47/1 X |
| 2,198,150 | 4/1940 | Barnhart | 47/1.2 |
| 2,803,091 | 8/1957 | Radford | 47/38 |
| 3,066,446 | 12/1962 | Buttinger | 47/38.1 |
| 3,069,807 | 12/1962 | Wall | 47/38.1 |
| 3,274,730 | 9/1966 | Bose | 47/1 |
| 3,407,608 | 10/1968 | Whitehead | 61/13 |
| 3,890,740 | 6/1975 | Miller | 47/58 |

FOREIGN PATENT DOCUMENTS

| 834,309 | 11/1938 | France | 47/48.5 |
|---|---|---|---|
| 625,540 | 9/1933 | Germany | 47/48.5 |
| 188,917 | 8/1906 | Germany | 47/19 |
| 237,927 | 6/1945 | Switzerland | 47/48.5 |
| 1,292,802 | 10/1972 | United Kingdom | 47/48.5 |

Primary Examiner—Clifford D. Crowder
Assistant Examiner—Steven A. Bratlie

[57] ABSTRACT

An aeration system for indoor and also outdoor plant life, fields, and grounds. In one form of the invention, moist air is injected into the root system of plant life so as to provide moisture proximate that plant nodules of the root system and thus foster growth. The water vapor introduced into the root system may be warmed and/or evaporated, as desired. In field and grounds use, perforate conduit is connected to the source of pressured air, water vapor, or other gases for the purpose of conditioning the fields and ground, either to remove moisture or to add moisture to plant life beneath, at, or even above the soil surface. The root system of trees may also be conditioned for regulating, relatively exactly, growth and dormant states.

3 Claims, 5 Drawing Figures

APPARATUS FOR AERATING COMMINUTED MATTER SUCH AS SOIL

FIELD OF INVENTION

The present invention relates to agricultural and horticultural arts and, more particularly, to a method of aerating soils and the root systems of plant life for effecting any one of a number of purposes and intended results. Specifically, the presented techniques of injecting air, gases, or vapors into soils, potted plants, and the like, effects many desirable results, depending upon the type of control used. Thus, there may be provided nitrogen fertilizer from an air source, frost control, regulation of growing and dormant seasons, air purification, treatment of hard crusty soil surfaces, drying of wet soils, aeration and moisturizing of certain types of soils, and so forth.

BRIEF DESCRIPTION OF PRIOR ART

Certain United States patents have issued and bear upon the concept and soils and soil treatment, as follows:
  U.S. Pat. No. 1,858,330
  U.S. Pat. No. 2,557,955
  U.S. Pat. No. 3,029,756
  U.S. Pat. No. 3,295,480
  U.S. Pat. No. 3,443,885
  U.S. Pat. No. 3,602,166
  U.S. Pat. No. 3,621,799

There have been certain prior investigations in connection with soil steaming, air injection by means of drills, and the distribution of chemicals as the above patents point out. There are a number of devices, of course, for injecting fluids both above and below ground.

BRIEF SUMMARY OF THE INVENTION

In the present invention conditioned air either pressurized and/or heated and possibly including water vapor, by way of example, is employed to treat soils and other beds for any one of a number of purposes. Such purposes may include the drying of wet soils, the aeration of soils, the treatment of hard crusty surfaces at regions beneath such surfaces, lenthening or shortening and/or acceleration or deceleration of growth patterns, frost control, and so forth. Also included in the invention are the concepts of providing humid zones at above ground levels, moving excessive moistures from soils into air there above, and generally purifying the air by depositing pollutants beneath ground surfaces by a natural air circulation process. Nitrogen from the air is likewise pumped into the soils, in certain applications, to obtain nitrogen food for plant use. The lengthening of the growing season for certain types of plants is accomplished herein, and this as well as the delaying of sap rise in fruit trees, and early blossoming, for example, by pumping cold air proximate fruit tree roots. In general, then, there is the benificent application of water vapor, gases, and aeration for the accomplishing of any one or more of several objectives as shall herein-after be pointed out.

OBJECTS

Accordingly, a principle object of the invention is to provide new methods and also apparatus of the treatment of soils and other comminuted structures supporting or intended for plant life.

Another object is to control the growing season of fruit trees and other types of plants.

Another object is to optimize soil and/or ambient atmospheric conditions through aeration and like techniques herein.

An additional object is to provide for the injection of nitrogen from the air into the soils.

A further object is to effect frost control and/or effect growing season as applied to certain types of crops.

An additional object is to provide aeration and/or water vapor injections into soils to regulate soil moisture content proximate plant root systems.

Figure 1:
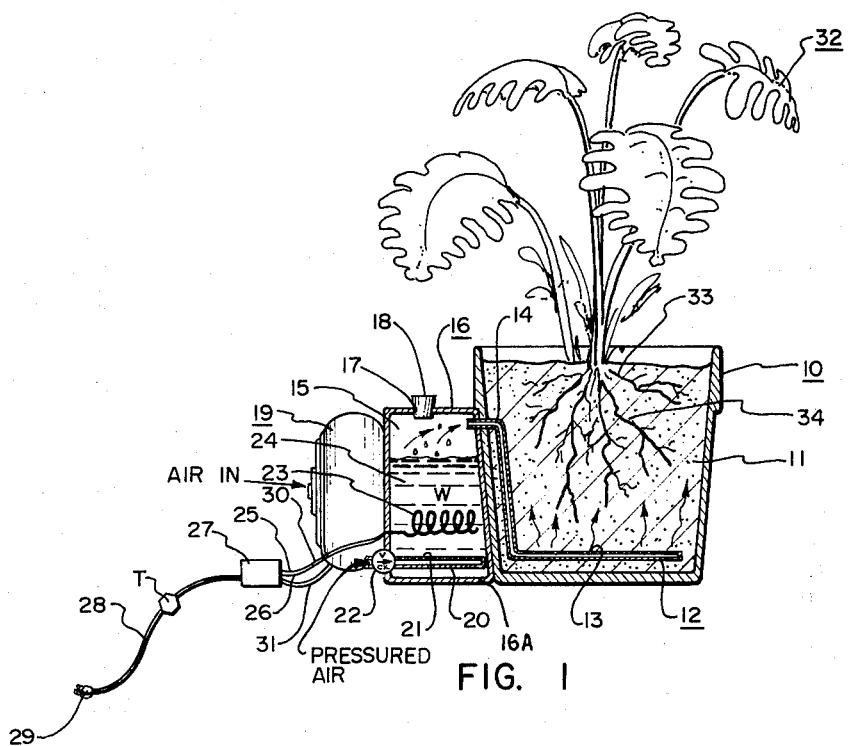
FIG. 1 is a front elevation, principally in section, of a potted indoor plant supplied with means for controlling moisture proximate root system of such plants.

In the drawings container 10 is filled with comminuted materials such as soil 11, or a crushed rock or other plant supporting system, and interiorly receives a container aerator 12 taking the form of a perforated tube at 13. Tube 13 is coupled by conduit 14 to the interior 15 of water container 16. Container 16 is provided with a water inlet 17, the latter being fitted with a solid removable closure means such as plug 18. Plug 18 may take a form simply of an elastomeric stopper of conventional design. Compressor 19 is provided, the same being provided for introducing air into and through perforate aerator tube 20, the latter having air outlet apertures 21 proximate container base 16. A check valve 22 may be provided to prevent the reverse flow of water.

A heating coil 23 is disposed in interior cavity 24 of the container 16, proximately above aerator tube 20 and beneath the fluid level of the water therein, and is connected by leads 25 and 26 to distributer block 27. Block 27 may simply comprise a splice or other connector, whereby the inlet cable 28, provided with AC Plug 29, may be connected to supply power to lead pairs 30 and 31. Lead pair 30 is used to supply electrical energy to the heating coil 23. Lead pair 31 supplies electrical power to compressor 19.

Plant 32 inculdes a root system 33 that is disposed within root zone 34 within container 10.

A primary teaching of the structure of FIG. 1 is that the root zone 34 can be supplied with a gas such as water vapor, i.e. vapor which is usable proximate the root nodules of the root system. This can serve the purpose to supply to the roots moisture or heated water vapor, or other gaseous material intended for the preservation and assistance of the healthy life of the plant.

In operation the plug 29 is connected to a conventional alternating current receptacle, this for supplying power to compressor 19 and coil 23. Either may be provided with an automatic or manually operated switch, not shown. Also, timer T can be employed to supply power intermittently to compressor 19 and to coil 23 as needed.

Where water is to be replenished within cavity 24, then water W can be supplied via inlet 17 when the plug 18 is temporarily removed.

It will be understood that the liquid at W in FIG. 1 may be replaced by a chemical or chemical additive and, in any event, falls within the basic teaching herein of providing aeration for soils or other root positioning media as, for example, hydroponic gravels and the like, and wherein needed gases and/or vapor can be supplied the root system of the plant.

Figure 2A:
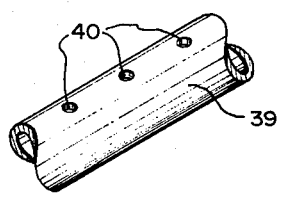
FIG. 2A is an enlarged, fragmentary detail in perspective view taken along the arcuate line 2A—2A in FIG. 2.
Figure 2:
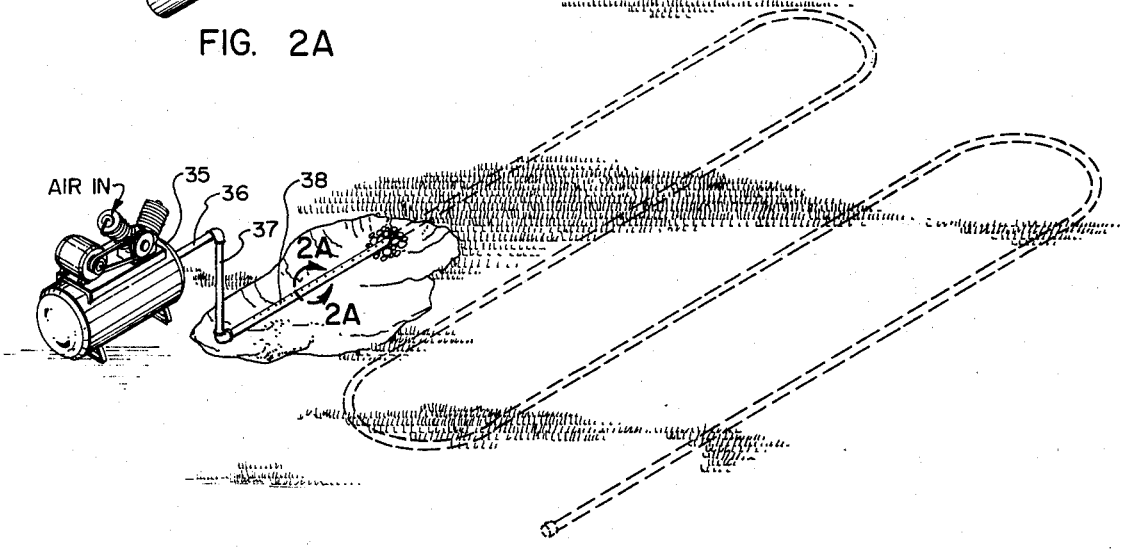
FIG. 2 is a ground or field layout of subsurface conduit intended for aerating and/or otherwise treating top soil and/or other areas.

FIG. 2 illustrates another form of the invention wherein aeration, with or without liquid or moisture additives, can be employed in connection with underground conduit; thus, in FIG. 2 compressor 35 includes outlet conduits 36 and 37 for supplying compressed air to under-ground conduit 38. The latter may be configured in a serpentine pattern and comprises plastic pipe 39 which is perforated at a series of perforation areas 40. Accordingly, air from the atmosphere or from a heated air source, or other moisture vapor may be urged by compressor 35 through the serpentine conduit 38 so as to supply aeration or forced vaporized media upwardly through the soil.

Figure 3:
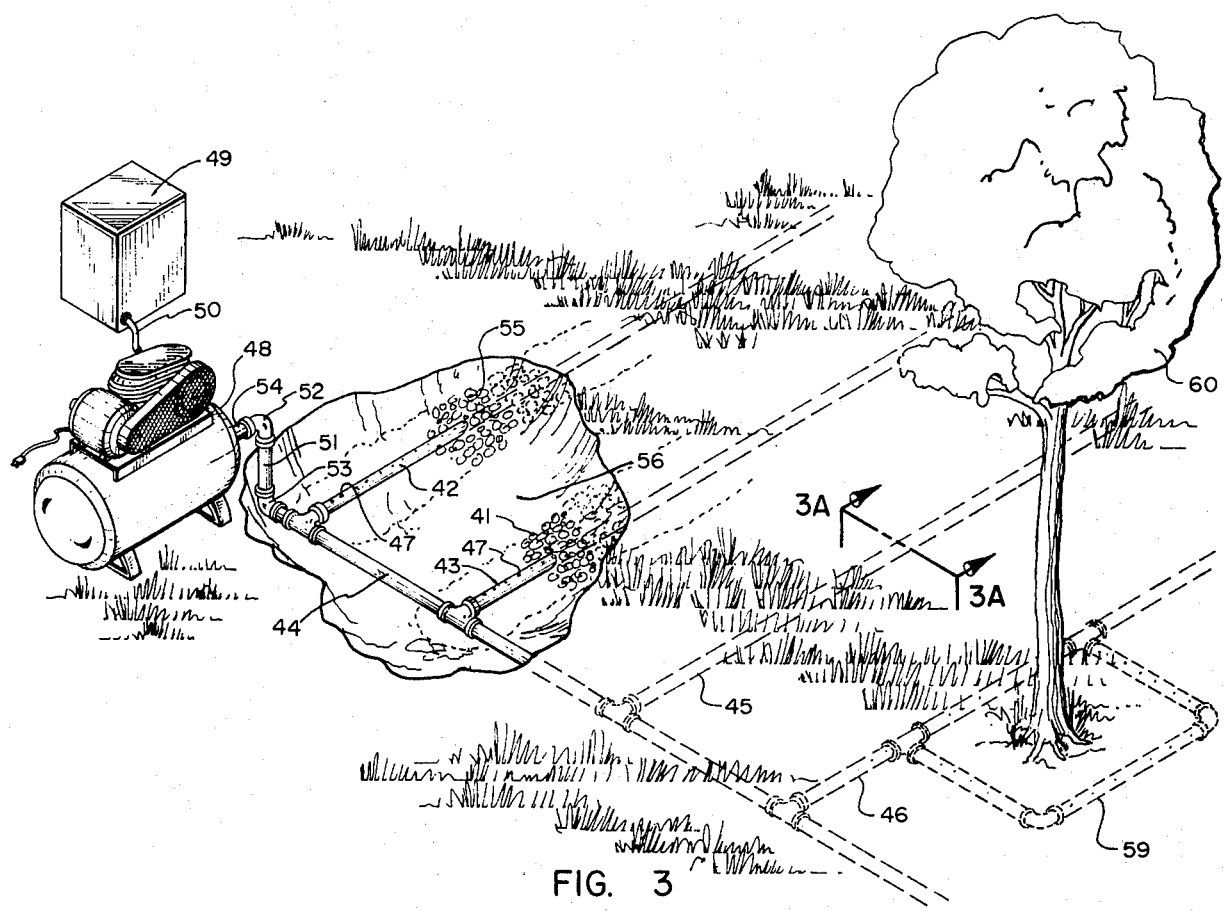
FIG. 3 is similar to FIG. 2 but illustrates rigid piping or conduit installed on the field for controlling the cyclical growth of trees and/or other plants, and also incorporates gravel beds proximate conduit for avoiding aerationhole fouling.
Figure 3A:
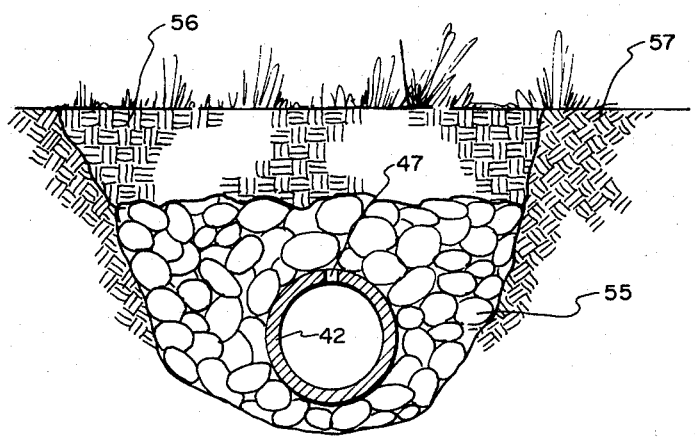
FIG. 3A is an enlarged section taken along the line of 3A—3A in FIG. 3. de

For conduit disposed underground, it is preferable that a gravel base as at 41 in FIG. 3 be provided. This is particularly true where rigid pipe at 42 and 43 are employed by way of example, see FIG. 3. FIG. 3 illustrates a main line 44 and a successive laterals 45 and 46, all of which are connected together, as shown, and may be perforated at 47 to provide for the ascent of air or other vapor or gaseous material through such perforations upwardly through the soil. Compressor 48 can simply receive air from the atmosphere or may be coupled to a warm air or vapor source 49 by conduit 50. Suitable conduit connection means such as stub lines 51 and elbows 52 and 53 can be employed to connect to the compressor outlet 54. Again, as in FIGS. 3 and 3A, it is highly desirable to provide a gravel bed 55 for each of the laterals 45, 46, 42, and so forth. Such a gravel bed is illustrated at 55 in FIG. 3A, indicating that the pipe can be surrounded by such gravel in order to avoid the clogging of air or vapor-releasing apertures 47.

Once the gravel bed or base 55 is supplied, soil 56 can be returned to to the general soil bed 57. Thus, FIG. 3 illustrates that pressured air, or even a heated air or vapor, may be fed underground to the underground conduit or piping system shown so as to aerate, moisten, or otherwise treat the soil. Other perforate branch lines at 59 can be installed to protect around the root areas of trees 60, if desired.

There are several desirable effects in injecting air or other gases or vapor, such as water vapor, in the soil.

As to aeration of soils, as by apparatus constructed in the manner shown in FIG. 1 or in FIGS. 2 and 3, aeration will create air spaces in a soil regardless of soil texture or classification. It is well known that aeration in the soil promotes microbial action and reduction of organics to usable salts in the soil.

The pumping of dry air in soils, as in FIG. 2, likewise tends to remove excess moisture in such soil by evaporation.

By application of air into a soil system having a relatively high water table, relative to the intended root system, there will be a tendency to keep the surface of the soil moist even though, otherwise, the same would be hard and crusty.

Where heated air is supplied, as in connection from a heated air source 49 in FIG. 3, then the soil can be warmed earlier in the spring and kept warm, and also continued warmer during the fall by injecting warm air below the frost line and thus moving the warm air upwardly. This tends to lengthen the growing season for certain types of crops, crops such as those species of tomatoes having shallow root systems.

In connection with tree 60, it is seen that fruit trees can be kept from blooming in the spring by injecting treated air into the soil as from air source 49 in connection with tree 60 in FIG. 3. In such event the air source 49 will be cooled, i.e. either refrigerated or perhaps drawn from certain areas of the ambient atmosphere. Accordingly, late-spring frost dangers can be eliminated for fruit trees, by simply injecting cold air into the ground proximate the trees roots so as to delay sap rise and budding until late-spring frost danager is clearly past. Subsequently, the air source can be changed to a heated source so that heated air is now pumped or piped into the ground, proximate the roots of the trees, so as to increase bacterial action, promote sap rise, and further the rapid growth of the tree with attendant blossoming thereof.

There is also the important aspect of supplying essentially "free" fertilizer to plant life by taking air and injecting that air, having naturally-contained nitrogen, into the soil. Certain types of aerobic bacteria will be responsive to the presence of such nitrogen so as to alter humus composition and create nitrates for plant use.

Injecting air into the soil also tends to purify air; hence, air might be injected into the soil, as in the case of FIG. 3, so that it may be purified and come through the ground clean; atmospheric residues will simply remain under-ground.

There are other advantages. Thus, by pumping warmed moist air into a root zone and letting it rise to the surface, as in the case of FIG. 1, or even at a corresponding outside location relative to large agricultural areas such as shown in FIG. 3, the pumping of warm moist air into root zones creates raised temperature zones of a predetermined desired temperature; furthermore, this principle can be used to create a relatively humid zone at above-ground levels, this to accomodate the rapid growth of certain types of plants.

Other advantages include either the removal of excessive moisture from the soil by the rising air, or the deposit of moisture from an air pumping source, as in FIG. 1, to leave moisture in the ground proximate the root zones of the growing plants.

Accordingly, there are many and varied ways of using the principle of the present invention, namely, that of pumping air, gases, or vapors, into the soil to effect one of several purposes, as above explained.

While particular embodiments of the invention have been shown and described, it will be obvious to those skilled in the art the various changes and modifications which may be made without departing from the essential features of the present invention and, therfore, the aim in the appended claims is to cover all such changes and modifications as fall within the true spirit and scope of the invention.

I claim:

1. In combination, a plant container for receiving comminuted material to surround and support the root system of a plant; an air compressor having a pressurized air outlet; a separate normally-closed water container partially filled with water and having a base and receiving said pressurized air outlet beneath the water container's water level and proximate said base, said water container including a separate outlet means above the water level and extending into said plant container for conveying water-entrained air from said water container to said plant container at a position below the top and above the bottom of said material when said plant container is filled; an externally connectable heating element disposed within said water container beneath said water level; and removable solid closure means for facilitating filling of said water container.

2. The combination of claim 1 wherein said pressurized air outlet includes a perforate aerator disposed within said water container beneath said water level, said plant container being provided with a perforate aerator communicating with the interior of said water container at said outlet means above said water level.

3. The combination of claim 1 wherein said water container is provided with perforate aeration means beneath the water level and communicating with said pressurized air outlet of said air compressor.

* * * * *